United States Patent
Khariwala et al.

(10) Patent No.: US 9,719,246 B2
(45) Date of Patent: Aug. 1, 2017

(54) VAPOUR-BARRIER MEMBRANE BASED ON A PA666/EVOH BLEND

(71) Applicant: SAINT-GOBAIN ISOVER, Courbevoie (FR)

(72) Inventors: Devang Khariwala, Marlborough, MA (US); Valerio Massara, Redavalle (IT)

(73) Assignee: SAINT-GOBAIN ISOVER, Courbevoie (FR)

( * ) Notice: Subject to any disclaimer, the term of this patent is extended or adjusted under 35 U.S.C. 154(b) by 246 days.

(21) Appl. No.: 14/381,435

(22) PCT Filed: Feb. 27, 2013

(86) PCT No.: PCT/FR2013/050395
§ 371 (c)(1),
(2) Date: Aug. 27, 2014

(87) PCT Pub. No.: WO2013/128114
PCT Pub. Date: Sep. 6, 2013

(65) Prior Publication Data
US 2015/0090126 A1    Apr. 2, 2015

(30) Foreign Application Priority Data
Feb. 28, 2012    (FR) .................................... 12 51773

(51) Int. Cl.
*B01D 53/22*    (2006.01)
*E04B 1/66*    (2006.01)
(Continued)

(52) U.S. Cl.
CPC ............ *E04B 1/665* (2013.01); *B01D 53/228* (2013.01); *B01D 67/002* (2013.01); *B01D 69/12* (2013.01);
(Continued)

(58) Field of Classification Search
CPC .... B01D 53/228; B01D 67/002; B01D 69/12; B01D 71/56; B01D 2323/08;
(Continued)

(56) References Cited

U.S. PATENT DOCUMENTS 2,631,939 A * 3/1953 Peters .................... A23G 9/221
    206/503
2,659,683 A * 11/1953 Jacobus ................ D21G 9/009
    106/270
(Continued)

FOREIGN PATENT DOCUMENTS

WO    2011 069672    6/2011

OTHER PUBLICATIONS

"Derive" American Heritage Dictionary of the English Language, Fifth Edition. 2011 by Houghton Mifflin Harcourt Publishing Company p. 1.*

(Continued)

*Primary Examiner* — Anthony Shumate
(74) *Attorney, Agent, or Firm* — Oblon, McClelland, Maier & Neustadt, L.L.P.

(57) ABSTRACT

The invention relates to a vapor retarder membrane, intended to be used for improving the airtightness of a building or of a room, comprising at least one active layer having a water vapor permeability which increases with the surrounding relative humidity, said active layer comprising at least 90% by weight of a blend of ethylene/vinyl alcohol (EVOH) copolymer and of a copolyamide 6-6.6 (PA666), the latter having a melting point below 210° C.

20 Claims, 1 Drawing Sheet

(51) Int. Cl.
    *C08L 77/06*    (2006.01)
    *E04B 1/62*     (2006.01)
    *B01D 67/00*    (2006.01)
    *B01D 69/12*    (2006.01)
    *B01D 71/56*    (2006.01)

(52) U.S. Cl.
    CPC .............. *B01D 71/56* (2013.01); *C08L 77/06* (2013.01); *E04B 1/625* (2013.01); *B01D 2323/08* (2013.01); *B01D 2325/00* (2013.01)

(58) Field of Classification Search
    CPC ..... B01D 2325/00; C08L 77/06; E04B 1/665; E04B 1/625
    See application file for complete search history.

(56) References Cited

U.S. PATENT DOCUMENTS

| | | | | |
|---|---|---|---|---|
| 2,882,258 | A * | 4/1959 | Briggs | C08L 9/06 523/307 |
| 3,456,044 | A * | 7/1969 | Pahlke | B29C 47/768 264/567 |
| 4,123,403 | A * | 10/1978 | Warner | C08J 3/03 523/313 |
| 4,734,327 | A * | 3/1988 | Vicik | B32B 27/08 428/332 |
| 4,749,744 | A * | 6/1988 | Uejo | C08L 23/0853 525/184 |
| 4,758,463 | A * | 7/1988 | Vicik | B32B 27/08 428/216 |
| 5,382,470 | A * | 1/1995 | Vicik | B32B 27/08 428/334 |
| 5,759,648 | A * | 6/1998 | Idlas | B32B 27/32 264/173.15 |
| 5,869,573 | A * | 2/1999 | Kuroda | B29C 47/0021 525/178 |
| 6,274,246 | B1 * | 8/2001 | Eggers | B32B 27/32 428/474.4 |
| 9,265,265 | B2 * | 2/2016 | Delius | A22C 13/0013 |
| 2002/0034622 | A1 * | 3/2002 | Edwards | B32B 27/08 428/220 |
| 2003/0041544 | A1 * | 3/2003 | Rusek, Jr. | E04B 1/762 52/481.1 |
| 2006/0246242 | A1 * | 11/2006 | Siegel | A23B 4/10 428/34.1 |
| 2007/0092744 | A1 * | 4/2007 | Di Tella | B32B 27/34 428/475.8 |
| 2008/0021156 | A1 * | 1/2008 | Arpin | C08L 23/04 525/57 |
| 2008/0095960 | A1 * | 4/2008 | Schell | B32B 7/10 428/34.8 |
| 2008/0113130 | A1 * | 5/2008 | Schell | B32B 7/10 428/34.8 |
| 2008/0182052 | A1 * | 7/2008 | Broadus | B32B 7/02 428/34.9 |
| 2008/0182053 | A1 * | 7/2008 | Broadus | B32B 27/34 428/34.9 |
| 2009/0285511 | A1 * | 11/2009 | Aithani | B65D 75/5805 383/200 |
| 2010/0203790 | A1 * | 8/2010 | Moulton | B32B 5/02 442/394 |
| 2012/0053282 | A1 * | 3/2012 | Shimizu | C08G 64/32 524/445 |
| 2012/0302698 | A1 | 11/2012 | Dorn et al. | |
| 2013/0025763 | A1 * | 1/2013 | Endo | B60C 1/0008 152/556 |
| 2013/0281589 | A1 * | 10/2013 | Thompson | C08L 77/02 524/232 |
| 2015/0021338 | A1 * | 1/2015 | Sheldon | B65D 81/24 220/577 |
| 2015/0133605 | A1 * | 5/2015 | Sato | C08G 69/36 525/57 |

OTHER PUBLICATIONS

The Engineering ToolBox "Thermal Conductivity of some common Materials" 4 pgs. Feb. 16, 2011 <https://web.archive.org/web/20110216121410/http://www.engineeringtoolbox.com/thermal-conductivity-d_429.html>.*

Sydney "Physics Resources Database" The University of Sydney 2 pgs. Feb. 21, 2011 <https://web.archive.org/web/20110221174143/http://www.physics.usyd.edu.au/teach_res/db/d0005e.htm>.*

International Search Report Issued Apr. 25, 2013 in PCT/FR13/050395 Filed Feb. 27, 2013, 6pgs.

* cited by examiner

VAPOUR-BARRIER MEMBRANE BASED ON A PA666/EVOH BLEND

The present invention relates to a vapor retarder membrane based on a homogenous blend of a particular copolyamide and of an ethylene/vinyl alcohol copolymer.

Vapor retarder membranes of which the permeability to water vapor varies according to the humidity in the air have been known for many years. For the reasons explained, for example, in application WO 96/33321, it is sought to obtain membranes which readily allow water vapor to pass through when the relative humidity (RH) is high (80% to 100% RH) and which effectively block it at low relative humidity (50% RH and less).

Such "smart" vapor retarder membranes are characterized by the permeance to water vapor, measured according to ASTM standard E 96 and expressed in perms.

It is also common to express the resistance of a membrane to water vapor diffusion in the form of the thickness of a layer of air which has the same permeance as the membrane under consideration. This thickness is expressed in meters and known as the "equivalent air thickness" ($S_d$).

The higher the $S_d$ of a vapor retarder membrane at low relative humidity and the lower its $S_d$ at high relative humidity, the more advantageous and effective it is generally considered to be. Moreover, those working in the construction industry generally want the $S_d$ to vary abruptly over a narrow relative humidity range. Finally, when the membrane must be used under particularly severe conditions, for example in climates with long, relatively humid, cold periods and only short warm periods, it is desirable to have membranes for which the variation in the $S_d$ occurs abruptly at quite high relative humidities, greater than 65%, preferably greater than 70%, or even greater than 75%.

The applicant has for many years sold vapor retarder membranes based on polyamide 6 under the trade names Vario KM and Vario KM Duplex. These membranes have a completely satisfactory water vapor permeability under humid conditions. Their resistance to water vapor diffusion in winter conditions when the air is dry and cold could, however, be advantageously increased with a view to use under more severe climatic conditions. Moreover, as shown in FIG. 2, the variation in $S_d$, according to the relative humidity, of the PA6 membranes (◇) is relative progressive.

The applicant thus set itself the objective of increasing the resistance to water vapor diffusion of the polyamide 6 membranes under low-humidity conditions while at the same time retaining a high permeance at high RH.

In its research aimed at improving the behavior of polyamide 6 vapor retarder membranes, the applicant has in particular tried to blend PA6 with EVOH having an ethylene content equal to 38 mol % (see WO 2011/069672). However, attempts to produce these membranes on an industrial scale have revealed considerable difficulties: at the relatively high processing temperatures required in order to obtain sufficient plasticity of the polyamide 6, the EVOH was subjected to thermal degradation and fouled up the kneading and extrusion equipment.

Another approach consisted in trying to replace the EVOH used in WO 2011/069672, having an ethylene content of 38%, with an EVOH having a higher or lower ethylene content. The applicant expected in particular to observe an improvement in the compatibility for higher vinyl alcohol contents (lower ethylene contents). Two series of tests with EVOH containing, respectively, 27 mol % and 44 mol % of ethylene were unfortunately not conclusive. Even for low EVOH contents of 10% and 15% relative to the sum of PA6+EVOH, the films proved to be difficult or even impossible to manufacture, and exhibited numerous gel points, holes and/or homogeneity defects.

After these failures, the applicant tried to replace, not the EVOH, but the PA6 with polymers that were similar, but sufficiently different to allow the homogenous incorporation of substantial fractions of EVOH. When testing, on this occasion, other polyamides and in particular various PA6 copolymers, the applicant noted that, quite surprisingly, PA666, a random copolymer which is intermediate between PA6 and PA66, was not only compatible with EVOH in any proportions, but that the vapor retarder membranes prepared from a homogenous blend of EVOH and of PA666 exhibited a significantly higher $S_d$ in a dry atmosphere than the Vario KM membranes based on PA6 homopolymer. This increase in the $S_d$ in a dry atmosphere (dry cup) was not accompanied by an equivalent increase in a wet atmosphere (wet cup) and the variation in water vapor permeability occurred very advantageously over a very narrow and quite high relative humidity range.

Consequently, a subject of the present invention is a vapor retarder membrane, intended to be used for improving the airtightness of a building or of a room, comprising at least one active layer having a water vapor permeability which increases with the surrounding relative humidity, said active layer comprising at least 90% by weight of a blend of ethylene/vinyl alcohol (EVOH) copolymer and of copolyamide 6-6.6 (PA666), the latter having a melting point below 210° C., preferably below 200° C.

Figure 1:
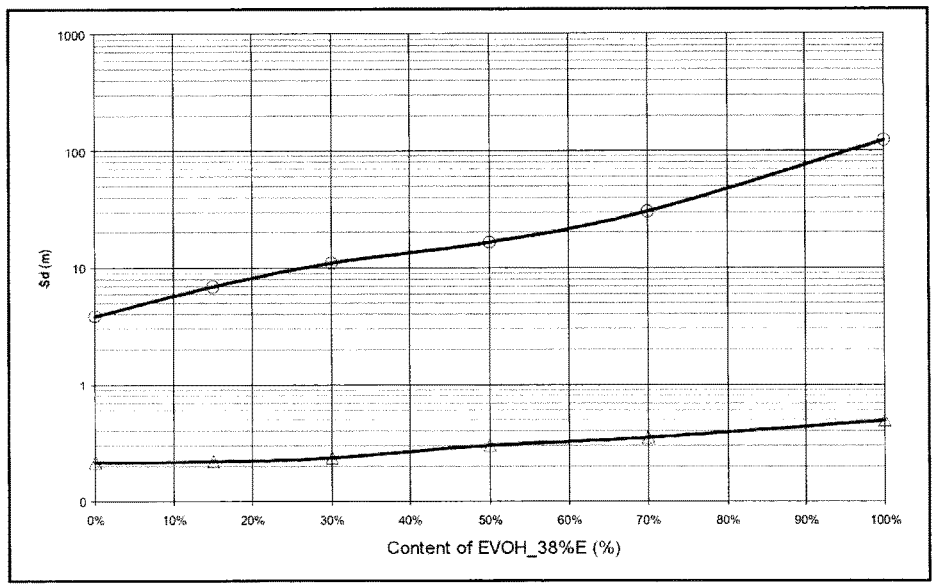
FIG. 1 shows the change in the $S_d$ in a wet atmosphere and in a dry atmosphere of a vapor retarder membrane with an active layer 50 m thick, as a function of the EVOH content.

In the present invention, the term "active layer" is intended to mean a continuous layer impermeable to liquid water and to air, the water vapor permeance of which, measured according to ASTM standard E 96, is at least five times greater at an average relative humidity of 75% (wet cup) than at an average relative humidity of 25% (dry cup).

This active layer preferably comprises at least 95%, in particular at least 98%, by weight of blend of EVOH and of PA666, and can even advantageously consist exclusively of such a blend.

Other ingredients, such as plasticizers, lubricants, flame-retardants, biocidal or biostatic agents or reinforcing fibers, may however be present in a proportion of at most 10% by weight, preferably of at most 5% by weight and in particular of at most 2% by weight, relative to the total weight of the active layer(s).

The PA666/EVOH blend-based active layer(s) is (are) advantageously the only active layer(s) of the membrane which preferably does not comprise other active layers within the meaning defined above.

The active layer or the assembly of active layers advantageously has a total thickness of between 20 and 100 μm, preferably between 25 and 80 μm, in particular between 30 and 65 μm. Generally, the increase in this thickness is reflected by an increase in the resistance to the water vapor diffusion both in a wet environment and in a dry environment, without however modifying the general appearance of the curve showing the variation in $S_d$ as a function of the average relative humidity.

The PA666/EVOH blend-based active layer(s) may not be the only layer(s) of the vapor retarder membrane. It may in fact be advantageous or even, in some cases, necessary to line the active layer(s) with a reinforcing or support layer, for example a textile of net or nonwoven type, attached on one side or both sides of the membrane or sandwiched between two active layers. Such a reinforcing or support layer, intended to remain in contact with the active layer throughout the lifetime of the membrane, must of course have a resistance to water vapor diffusion which is negligible compared with that of the active layer.

It is also possible to envisage the use of one or two protective layers intended to be removed, generally by peeling, at the time the vapor retarder membrane is applied. These peelable protective layers may be impermeable to water and to water vapor.

The active layer or the assembly of active layers preferably represents at least 40% by weight, in particular at least 50% by weight and ideally at least 60% by weight or even more than 80% by weight of the membrane.

As explained in the introduction, the applicant noted that PA666, unlike PA6 homopolymer, was miscible in all proportions with EVOH, and that all the blends prepared from these two polymers made it possible to easily prepare thin, homogeneous, transparent vapor retarder membranes having a water vapor permeance which increases with the average relative humidity.

The EVOH/PA666 weight ratio is consequently advantageously between 10/90 and 90/10, preferably between 20/80 and 70/30, and in particular between 30/70 and 50/50. The limitation of the EVOH content is advantageous not just from a technical point of view but from the point of view of the cost price of the raw materials. EVOH is in fact more expensive than PA666. If this situation were to change in the medium term, blends having EVOH/PA666 ratios of between 50/50 and 90/10, preferably between 60/40 and 80/20, could become very advantageous from both a technical and an economic point of view.

FIG. 1 shows the change in the $S_d$ in a wet atmosphere (Δ: wet cup: average RH 75%) and in a dry atmosphere (O: dry cup; average RH 25%) of a vapor retarder membrane with an active layer 50 μm thick, as a function of the EVOH content. The EVOH used is a product sold by the company Kuraray Co. Ltd. and which has an ethylene content of 38 mol %.

It is noted that the $S_d$ in a dry atmosphere continually increases, from a value of approximately 4 m for pure PA666 to more than 100 m for pure EVOH. On the other hand, in a wet atmosphere, there is only a negligible increase in this same $S_d$ value (from 0.2 m for 100% PA666 to 0.5 m for 100% EVOH). In other words, the greater the EVOH content, the greater and therefore the more advantageous the $S_{d\ dry}/S_{d\ wet}$ ratio.

PA666, or PA6/66, or PA6-6.6, or nylon 666 (CAS No. 24993-04-2) is a random crystalline copolymer comprising PA6 units derived from -caprolactam or from aminocaproic acid, and PA66 units derived from hexanedioic acid (adipic acid) and from hexamethylenediamine or from hexamethylenediammonium adipate. Its melting point must be sufficiently low to allow the preparation of a homogeneous blend with EVOH at temperatures where there is no risk of the EVOH being thermally degraded. Various products which have appropriate melting points are available on the market. They all have a content of PA6 units greater than the content of PA66 units. The PA6 unit/PA66 unit molar ratio of the PA666 copolyamides used in the present invention is advantageously between 97/3 and 50/50, preferably between 95/5 and 55/45, in particular between 90/10 and 60/40.

By way of examples of PA666 available on the market, mention may be made of the products Ultramid® C33 01, Ultramid® C33 LN 01 and Ultramid® C4001 sold by the company BASF, or the products UBE Nylon of the 5000 series (5024, 5033B, 5034B, 5024FDX57, 5033FDX27, 5033FDS, 5034FDX40, 5034FDX17, 5034MTX1) sold by the company UBE.

Similarly, there is a wide range of ethylene/vinyl alcohol random copolymers (CAS No. 26221-27-2) on the market, sold for example by the company Kuraray under the trade name EVAL®. The ethylene content of the EVOHs used in the present invention is preferably between 20% and 50% by weight, in particular between 25% and 45% by weight. Higher ethylene contents are, a priori, less advantageous for the application as vapor retarder membrane since they contain fewer hydrogen bonds, which are known to be essential for obtaining good vapor retarder properties.

By way of examples, mention may be made of the products
EVAL M (24 mol % of ethylene);
EVAL L (27 mol % of ethylene);
EVAL F, T or J (32 mol % of ethylene);
EVAL C (35 mol % of ethylene);
EVAL H (38 mol % of ethylene);
EVAL E (44 mol % of ethylene);
EVAL G (48 mol % of ethylene);
all sold by the company Kuraray Co. Ltd., first and foremost as polymers which have an excellent barrier effect against oxygen diffusion. A range of products which are similar and just as suitable is sold under the trade name Soarnol® by the company Nippon Gohsei.

A subject of the present invention is also a process for manufacturing the membranes described above, comprising the preparation of a homogenous blend of the two polymers, followed by a step of forming the membranes.

More specifically, the process for preparing the vapor retarder membranes of the present invention comprises the following successive steps:
the heating and kneading, at a temperature of between 200° C. and 230° C., preferably between 205° C. and 225° C., of EVOH and of PA666 until a homogeneous blend of these polymers is obtained, and
the forming of a membrane from the homogenous blend of EVOH and of PA666 thus obtained.

The heating and kneading step can be carried out in a known manner in an extruder.

The step of forming the membrane is preferably carried out by extrusion, mechanical drawing, calendering and/or blow-molding of the polymer blend.

The vapor retarder membranes thus prepared, consisting only of the active layer, can subsequently be applied, for example under pressure and/or with heating, or by means of a suitable adhesive, to the optional support or protective layers.

The vapor retarder membranes of the present invention can be used in exactly the same way as known vapor retarder membranes, for example the Vario KM and Vario KM Duplex membranes made of PA6, for improving the airtightness of buildings or rooms. Their water-permeability properties mean that they are particularly well-suited to wetter and colder climates rather than moderate climates for which the polyamide 6 membranes are commonly used.

During this use, the membranes are generally applied to the internal face of the walls of the building or of the room to be made leaktight. The expression "to the internal face" encompasses in particular the application of the membranes to other coatings and layers already present on said wall, in particular any type of thermal insulation materials, for example based on mineral wool.

The vapor retarder membrane is then applied in an internal position relative to the thermal insulation material, preferably in direct contact therewith.

Figure 2:
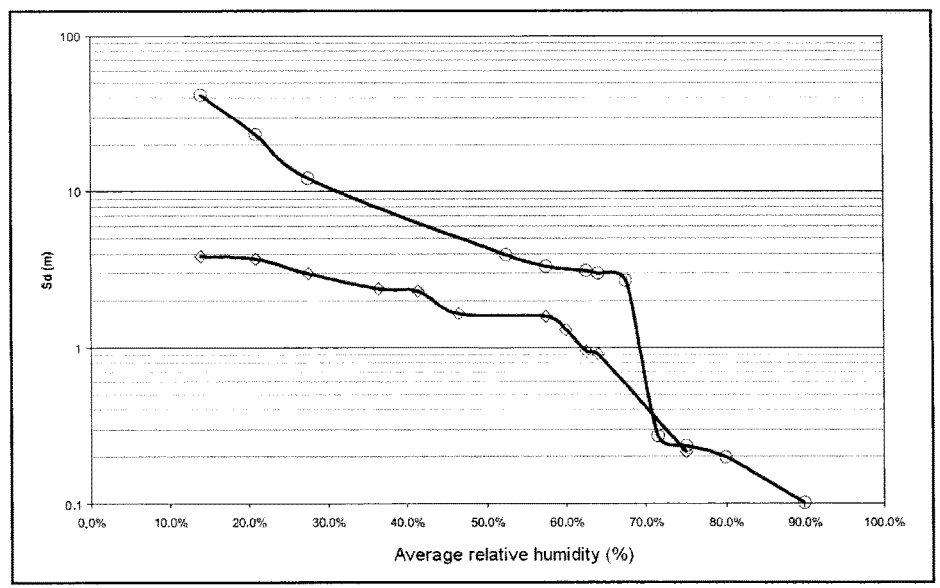
FIG. 2 shows the change in the $S_d$ as a function of the average humidity of the surrounding atmosphere of a PA666/EVOH membrane (O) in comparison with a Vario membrane (◇) of the same thickness, consisting of a PA6 homopolymer.

FIG. 2 shows, by way of example, the change in the $S_d$ (logarithmic scale) as a function of the average humidity of the surrounding atmosphere, determined according to standard EN ISO 12572; 2001, of a PA666/EVOH membrane (O) according to the invention (thickness 50 µm, 70/30 PA666/EVOH, ethylene content of the EVOH used: 38 mol %; 85/15 PA6 units/PA66 units) in comparison with a Vario membrane (◇) of the same thickness, consisting of a PA6 homopolymer.

It can be noted that, in a wet atmosphere (75% RH), the two membranes advantageously exhibit a high water vapor permeance, i.e. their equivalent air thickness is low, about 0.2 to 0.3 m. At low relative humidity (27.5%), the equivalent air thickness of the membrane according to the invention ($S_d$=12 m) is four times higher than that of the known membrane ($S_d$=3 m). The membrane according to the invention differs, moreover, from the known membrane in that the equivalent air thickness varies greatly over a very narrow humidity range, growing from a value of approximately 0.2 for 75% RH to a value of approximately 2.7 for 68% RH.

The invention claimed is:

1. A vapor retarder membrane, comprising one active layer or an assembly of more than one active layer having a water vapor permeability that increases with surrounding relative humidity, wherein:
    said one active layer or assembly of more than one active layer comprises at least 90% by weight of a blend of ethylene/vinyl alcohol (EVOH) copolymer and of a copolyamide 6-6.6 (PA666) having a melting point below 210° C.,
    an EVOH/PA666 weight ratio in said blend is 10/90-50/50,
    the total thickness of the one active layer or the assembly of more than one active layer is 20-100 µm, and
    the one active layer or the assembly of more than one active layer is at least 40% by weight of the vapor retarder membrane.

2. The vapor retarder membrane as claimed in claim 1, wherein the one active layer or the assembly of more than one active layer comprises at least 95% by weight of the blend of EVOH and of PA666.

3. The vapor retarder membrane as claimed in claim 2, wherein the one active layer or the assembly of more than one active layer consists essentially of the blend of EVOH and of PA666.

4. The vapor retarder membrane of claim 1, wherein the EVOH/PA666 weight ratio is 20/80-50/50.

5. The vapor retarder membrane of claim 1, wherein the membrane does not comprise another type of active layer or layers.

6. The vapor retarder membrane of claim 1, wherein an ethylene content of the EVOH is between 20 and 35 mol %.

7. The vapor retarder membrane of claim 1, wherein the PA666 is a random copolymer comprising PA6 units and PA66 units and having a PA6 unit/PA66 unit molar ratio of between 97/3 and 50/50.

8. The vapor retarder membrane of claim 1, wherein the total thickness of the one active layer or the assembly of more than one active layer is 25-80 µm.

9. The vapor retarder membrane of claim 1, further comprising a support layer or protective layer or both which is optionally peelable.

10. The vapor retarder membrane of claim 1, wherein the one active layer or the assembly of more than one active layer is more than 80% by weight of the membrane.

11. A process for manufacturing the vapor retarder membrane of claim 1, the process comprising heating and kneading, at a temperature of between 200° C. and 230° C., EVOH and PA666 until a homogeneous blend of these polymers is obtained, and
    forming a membrane from the homogenous blend of EVOH and of PA666.

12. The process as claimed in claim 11, wherein the forming of the membrane is by extrusion, mechanical drawing, calendering, and/or blow-molding of the polymer blend.

13. A process for improving airtightness of a building or of a room in a building, the process comprising applying the vapor retarder membrane of claim 1 to an internal face of a wall of said building or of said room.

14. The process as claimed in claim 13, wherein the applying comprises applying the membrane in an internal position relative to a thermal insulation material.

15. The vapor retarder membrane of claim 4, wherein the EVOH/PA666 weight ratio is 30/70-50/50.

16. A vapor retarder membrane, comprising an active layer having a water vapor permeability that increases with surrounding relative humidity,
    wherein the active layer comprises at least 90% by weight of a blend of ethylene/vinyl alcohol (EVOH) copolymer and of a copolyamide 6-6.6 (PA666) having a melting point below 210° C.
    wherein an EVOH/PA666 weight ratio in said blend is 10/90-50/50, and
    wherein the active layer is 50 µm thick, the PA666 is a random copolymer comprising PA6 units and PA66 units and has a PA6 unit-PA66 unit molar ratio of 85/15, the EVOH/PA666 weight ratio in the active layer is 30/70, and the ethylene content of the EVOH is 38 mol %.

17. The vapor retarder membrane as claimed in claim 16, wherein the active layer consists essentially of the blend of EVOH and of PA666.

18. The vapor retarder membrane as claimed in claim 1, wherein the vapor retarder membrane comprises one active layer.

19. The vapor retarder membrane as claimed in claim 1, wherein the vapor retarder membrane comprises the assembly of more than one active layer.

20. The vapor retarder membrane of claim 1, wherein the one active layer or the assembly of more than one active layer is at least 60% by weight of the vapor retarder membrane.

* * * * *